(12) United States Patent
Meiners

(10) Patent No.: US 8,201,378 B2
(45) Date of Patent: Jun. 19, 2012

(54) GUIDE SYSTEM FOR POWER MODULES

(75) Inventor: Karl-Heinz Meiners, Neuenkirchen (DE)

(73) Assignee: General Electric Company, Schenectady, NY (US)

( * ) Notice: Subject to any disclaimer, the term of this patent is extended or adjusted under 35 U.S.C. 154(b) by 384 days.

(21) Appl. No.: 12/511,177

(22) Filed: Jul. 29, 2009

(65) Prior Publication Data

US 2010/0139180 A1 Jun. 10, 2010

(51) Int. Cl.
*E04H 12/00* (2006.01)

(52) U.S. Cl. ........... 52/651.04; 52/651.03; 52/651.08; 52/651.11; 52/834; 52/843; 290/55

(58) Field of Classification Search .. 52/651.01–651.04, 52/651.07–651.09, 651.11, 653.1, 745.17, 52/834, 843, 745.18, 835; 290/55

See application file for complete search history.

(56) References Cited

U.S. PATENT DOCUMENTS

| | | | | |
|---|---|---|---|---|
| 6,116,179 A * | 9/2000 | Swinbanks et al. | ........... | 114/269 |
| 6,713,891 B2 * | 3/2004 | Kirkegaard et al. | ............ | 290/44 |
| 7,504,742 B2 * | 3/2009 | Wobben | .......................... | 290/55 |
| 7,663,263 B2 * | 2/2010 | Wobben | .......................... | 290/55 |
| 7,877,935 B2 * | 2/2011 | Ollgaard | ............................ | 52/40 |
| 2003/0015877 A1 * | 1/2003 | Schlemenat | ..................... | 290/55 |
| 2004/0131467 A1 * | 7/2004 | Wobben | ..................... | 416/132 B |
| 2007/0125037 A1 * | 6/2007 | Meiners | ....................... | 52/720.1 |
| 2007/0296220 A1 * | 12/2007 | Kristensen | ....................... | 290/55 |
| 2010/0122508 A1 * | 5/2010 | Kristensen | .................. | 52/651.01 |
| 2010/0146901 A1 * | 6/2010 | Griffiths et al. | ............ | 52/651.11 |
| 2010/0186342 A1 * | 7/2010 | Ollgaard | .................... | 52/745.17 |

* cited by examiner

*Primary Examiner* — Brian Glessner
*Assistant Examiner* — Adriana Figueroa
(74) *Attorney, Agent, or Firm* — Cantor Colburn LLP

(57) ABSTRACT

A tower includes an outer portion forming an outer covering for the wind turbine tower and an inner portion disposed within the outer portion. The inner portion includes a preassembled power module including an upwardly extending support and electrical components that extend outwardly beyond the upwardly extending support and guide supports coupled at a first end to the upwardly extending supports and extending outwardly beyond the electrical components.

18 Claims, 3 Drawing Sheets

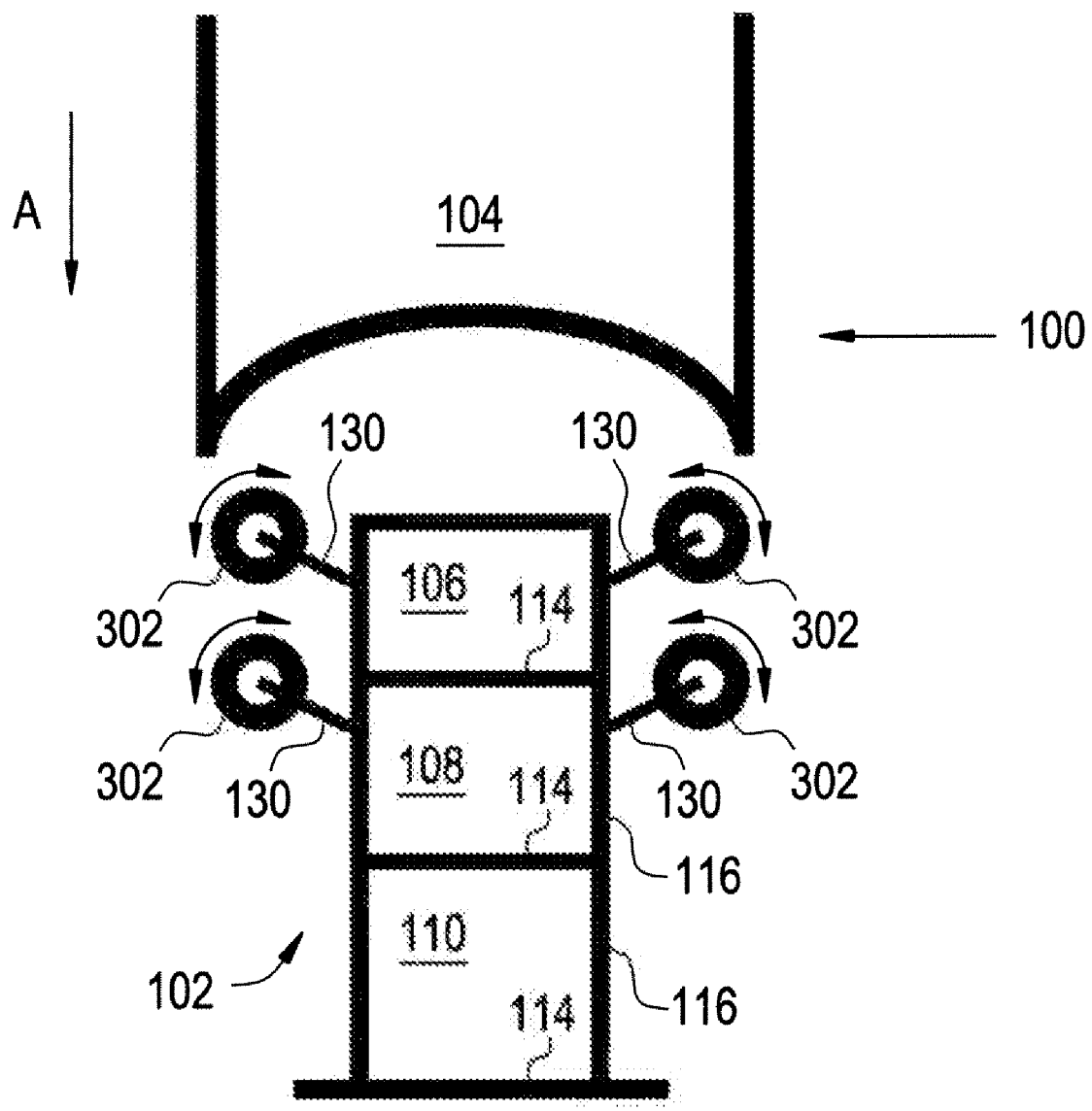

GUIDE SYSTEM FOR POWER MODULES

BACKGROUND OF THE INVENTION

The subject matter disclosed herein relates to an electrical section of towers and, in particular, to safety guide systems for modules within an electrical section of a tower.

Wind turbines, as known in the prior art, include a tower portion and a rotor mounted on top of the tower portion. The rotor portion may include one or more blades that rotate about a center point (rotor) when in the presence of wind. The rotor motion may then be converted to electrical or other energy by known means.

Many wind towers include electrical machinery within them for converting rotational energy (from the rotor portion) into electrical energy. To save space the electrical machinery is located within the tower portion. The electrical machinery may include, for example, converter electronics, voltage switch gear and a transformer. In some cases, each of these components may be made in a pre-assembled power module (PPM). The PPM's are stacked one on top of one another and then surrounded by the tower portion.

Building a wind tower typically includes first building an electrical tower that includes a plurality of stacked PPMs. The tower portion (either as one piece or in separate pieces) is then lowered down from above to surround the PPMs. Once lowered, the lower tower section is secured to a foundation or tower foundation adapter located on the foundation.

Typically, as the tower sections are being lowered, a technician is located on each internal level to ensure that the tower section does not contact and, thus, damage the electronics on each of the stacked PPMs. Because wind towers are typically located in areas having frequent wind currents, it is common for wind gusts to move the tower sections as they are being lowered. This could lead to injury to the electronics if contacted by the moving tower sections.

BRIEF DESCRIPTION OF THE INVENTION

According to one aspect of the invention, a tower including an outer portion forming an outer covering for the tower is provided. The tower of this aspect includes an inner portion disposed within the outer portion. The inner portion includes a preassembled power module including an upwardly extending support and electrical components that extend outwardly beyond the upwardly extending support and guide supports coupled at a first end to the upwardly extending support and extending outwardly beyond the electrical components.

According to another aspect of the invention a preassembled power module for use in a tower is provided. This module of this aspect includes an upwardly extending support and electrical components that extend outwardly beyond the upwardly extending support. The module also includes guide supports coupled at a first end to the upwardly extending support and extending outwardly beyond the electrical components.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is side view of an alternative embodiment of an electrical section of a tower as it being constructed.

The detailed description explains embodiments of the invention, together with advantages and features, by way of example with reference to the drawings.

DETAILED DESCRIPTION OF THE INVENTION

Figure 1:
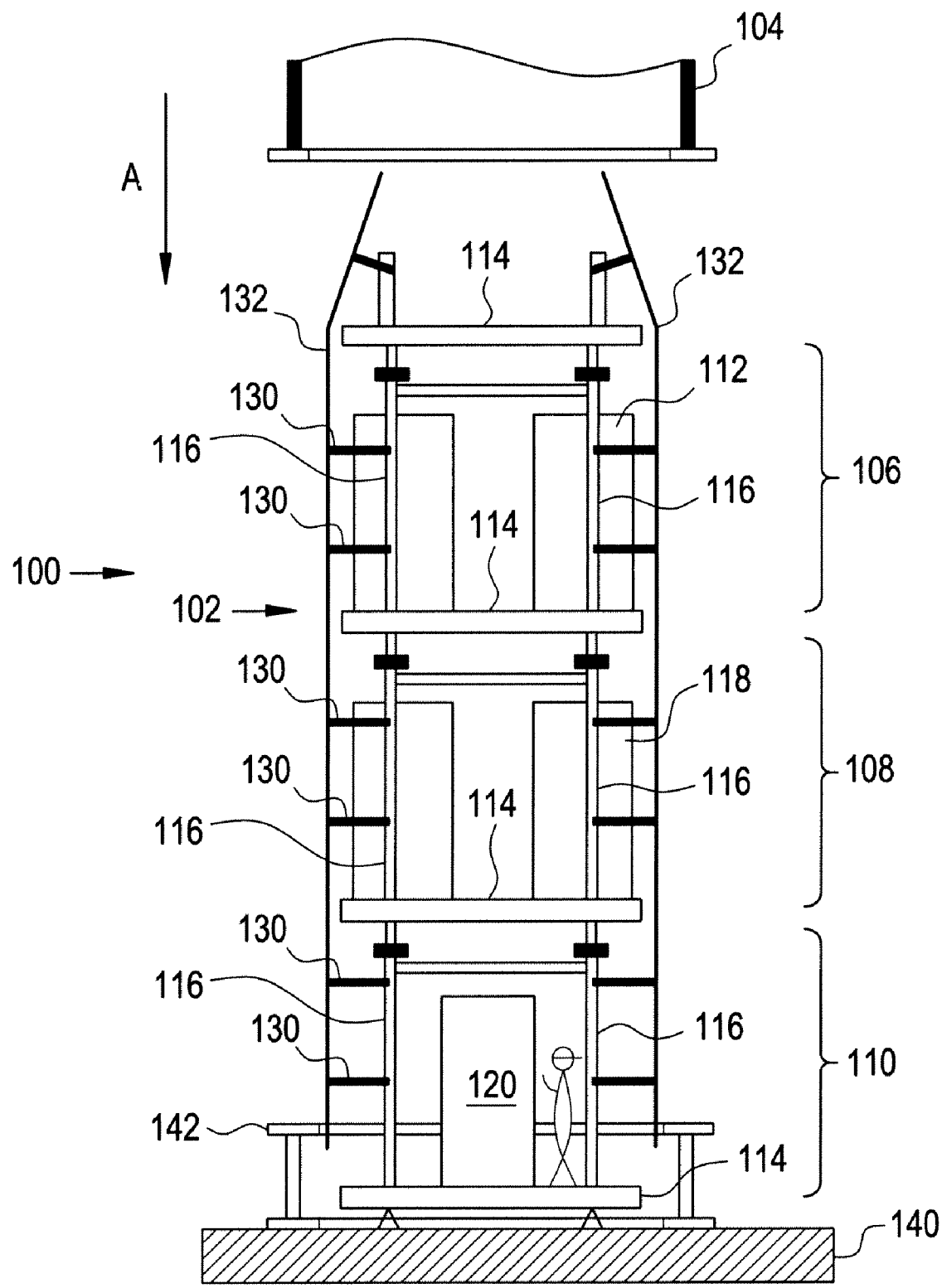
FIG. 1 is a side view of a portion of an electrical section of a tower as it is being constructed.

FIG. 1 shows a portion of an electrical section of a tower 100 according to an embodiment of the present invention. In one embodiment, the electrical section of the tower 100 may be the tower portion of a wind turbine but is not limited to such an application.

The electrical section of the tower 100 includes an inner portion 102 and an outer portion 104. The outer portion 104 may be lowered down from above in the direction shown by arrow A to surround the inner portion 102. As discussed above, lowering the outer portion 104 during windy conditions may prove difficult in the prior art as any sideways motion of the outer portion 104 may cause it to contact the inner portion 102. This may lead to damage of, for example, electrical components housed by the inner portion 102. To avoid such damage, in the prior art, a technician may have been required on each level (106, 108, 110, for example) as the outer portion 104 was lowered down around the inner portion 102. However, even with technicians present, the possibility of damage to the electrical components of the electrical tower 100 may still exist.

The electrical section of the tower 100 includes, in this example, three levels 106, 108 and 110. In one embodiment, some or all of these levels may be pre-assembled power modules (PPMs). Or course, any number of levels may be included and the three levels shown in FIG. 1 are by way of example only.

In one embodiment, the top level 106 is a converter level. The top level 106 may include an electrical convert unit(s) 112. The top level 106 may also include structural elements that form the basic structure of the PPM. In this example, the top level 106 includes a horizontal support 114 that forms the base of the PPM and upwardly extending supports 116. It should be understood that each PPM may include only one substantially centrally located upwardly extending support rather than the multiple upwardly extending supports shown in the drawings.

Below the top level 106 is a middle level 108. In one embodiment, the middle level 108 is a controller level. The middle level 108 may include a controller unit(s) 11 8. The middle level 108 may also include structural elements that form the basic structure of the PPM. In this example, the middle level 108, like the top level 106, includes a horizontal support 114 that forms the base of the PPM and upwardly extending supports 116.

Below the middle level 108 is a base level 110. In one embodiment, the base 110 is a transformer level. The bottom level 110 may include an electrical transformer unit 120. The bottom level 110 may also include structural elements that form the basic structure of the PPM. In this example, the bottom level 110 includes a horizontal support 114 that forms the base of the PPM and upwardly extending supports 116.

The base level 110 may sit on a foundation 140. In one embodiment, and as shown in FIG. 1, the foundation 140 may have attached thereto a tower foundation adapter 142 configured to provide support to the outer portion 104 when it is situated on the foundation 140.

Each level in the electrical section of the tower 100 includes guide supports 130 coupled to the upwardly extending supports 116. These guide supports 130 extend outwardly from the upwardly extending supports 116. In one embodiment the guide supports 130 may also extend outwardly and be connected to horizontal supports 114.

In one embodiment, the guide supports 130 extend at least beyond any electrical or other component in a particular level. In one embodiment, the guide supports 130 may extend outwardly beyond the horizontal support 114 of any particular level to which it is attached. Of course, not every level needs to include guide supports 130. In one embodiment, only one level may include guide supports 130. In other embodiments, two or more levels may include guide supports 130.

As shown, the guide supports 130 are coupled to and external rail 132. The number of external rails may vary but in one embodiment, the inner portion 102 includes two external rails 132. It shall be understood, however that external rails 132 are not required and may be replaced, for example, with wheels at the distal end of the guide supports 130. Regardless, the rails 132 (or wheels) provide a barrier that keeps the outer portion 104 from contacting any electrical component on any level without requiring a technician.

Figure 2:
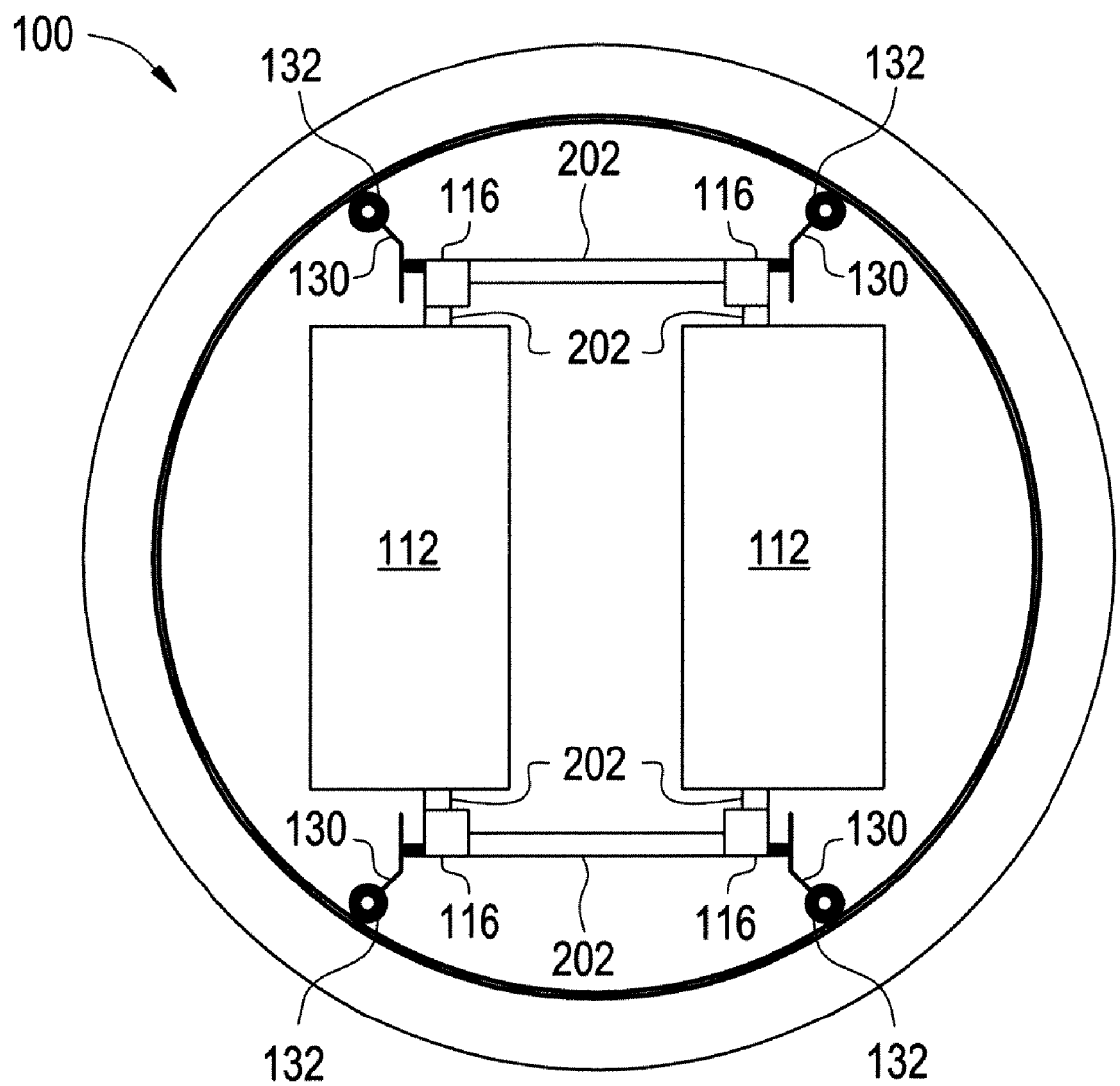
FIG. 2 is a cut-away top view of an electrical section of a tower according to one embodiment.

FIG. 2 is in cut-away overhead view of an electrical tower 100. The view shown in FIG. 2 includes an outer portion 104 that surrounds an a electrical level. In FIG. 2, the electrical level shown is a converter level 106. Of course, the electrical level could be any type of level.

The converter level 106 includes structural elements 202. These structural elements 202 may be coupled to the upwardly extending supports 116 to form a PPM structure. The PPM structure may include electrical components, for example, converter units 112 coupled thereto.

The converter level 106 (or any other level) may also include guide supports 130. As shown, the guide supports 130 are coupled to the upwardly extending supports 116. Of course, the guide supports 130 could be coupled to any portion of the PPM structure. For example, the guide supports 130 could be coupled to structural elements 202.

The guide supports 130, in one embodiment extend outwardly from the PPM structure beyond any other portion of the PPM structure. That is, when located within an outer portion 104, the guide supports 130 extend away from the PPM structure such that the outer portion 104 cannot contact any portion of the PPM structure or any electrical component attached thereto without first contacting a guide support.

In one embodiment, and as shown in FIG. 2, the guide supports 130 are coupled at their distal ends to the guide rails 132. The guide rails 132 may extend in a direction that is more vertical than horizontal. The guide rails 132 may, thus, create an external structure that surrounds the PPM. This external structure protects all portions of the PPM from contacting the outer portion 104 as it is being lowered down to surround the PPM.

In one embodiment, the guide supports 130 may be removed after the outer portion 104 has been secured. Of course, in such an embodiment, the guide rails 132 may also be removed. In another embodiment, the guide supports 130, the guide rails 132 or both may remain coupled to the PPM structure.

FIG. 3 shows an alternative embodiment of an electrical section of the tower 100. In one embodiment, the electrical section of the tower 100 may be the tower portion of a wind turbine but is not limited to such an application.

The electrical section of the tower 100 includes an inner portion 102 and an outer portion 104. The outer portion 104 may be lowered down from above in the direction shown by arrow A to surround the inner portion 102. As discussed above, lowering the outer portion 104 during windy conditions may prove difficult in the prior art as any sideways motion of the outer portion 104 may cause is contact the inner portion 102. This may lead to damage of, for example, electrical components housed by the inner portion 102.

As shown, the inner portion 102 includes a top layer 106, a middle layer 108 and a bottom layer 110. Each layer may be, for example, made from an individual PPM.

Each level in the electrical section of the tower 100 includes guide supports 130 coupled to the upwardly extending supports 116. These guide supports 130 extend outwardly from the upwardly extending supports 116. In one embodiment the guide supports 130 may also extend outwardly and be connected to horizontal supports 114.

In one embodiment, the guide supports 130 extend at least beyond any electrical or other component in a particular level. In one embodiment, the guides may extend outwardly beyond the horizontal support 114 of any particular level to which it is attached. Of course, not every level needs to include guide supports 130. In one embodiment, only one level may include guide supports 130. In other embodiments, two or more levels may include guide supports 130.

In this embodiment, rather than the rails described above, each guide support 130 may include a wheel 302 attached to a distal end of the guide supports 130. These wheels 302 may be flexible and may rotate in one embodiment. It shall be understood, that embodiments of the present invention may include some or all of the portions of the embodiments shown in FIGS. 2 and 3. That is, some of the guide supports 130 may be coupled to rails and others to wheels.

In one embodiment, the guide supports 130 may be attached so that they may deflect from their original orientation under stresses. For example, the guide supports 130 may include a spring portion that allows for deflection of thereof In addition, the guide supports 130 may be sized such that they extend to a distance that almost touches the outer portion 104 as it is lowered towards the foundation. As such, even the presence of strong winds, the outer portion 104 may be limited in its motion and, the amount of kinetic energy it may impart to the inner portion if it comes into contact with the guide supports 130.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tower comprising:
an outer portion forming an outer covering for the wind turbine tower;
an inner portion disposed within the outer portion, the inner portion including:
a preassembled power module including an upwardly extending support and electrical components that extend outwardly beyond the upwardly extending support;

guide supports coupled at a first end to the upwardly extending support and extending outwardly beyond the electrical components; and an external rail coupled to a second end of at least one of the guide supports and extending upwardly along at least a portion of the inner portion.

2. The tower of claim 1, wherein the inner portion further includes:

a wheel coupled to a second end of another of the at least one of the guide supports.

3. The tower of claim 1, wherein the inner portion further includes:

an additional external rail coupled to a second end of another of the guide supports and extending along at least a portion of the inner portion.

4. A tower comprising:

an outer portion forming an outer covering for the wind turbine tower;

an inner portion disposed within the outer portion, the inner portion including:

a preassembled power module including an upwardly extending support and electrical components that extend outwardly beyond the upwardly extending support; and guide supports coupled at a first end to the upwardly extending support and extending outwardly beyond the electrical components;

wherein the inner portion further includes:

a rotable wheel coupled to a second end of at least one of the guide supports.

5. The tower of claim 1, wherein the guide supports deflect in response to an external force.

6. The tower of claim 1, wherein the preassembled power module further includes:

one or more additional upwardly extending supports.

7. The tower of claim 1, wherein the inner portion and the outer portion are supported by a foundation.

8. The tower of claim 1, wherein the inner portion further includes:

an additional preassembled power module including an upwardly extending support and electrical components that extend outwardly beyond the upwardly extending support and located on top of the preassembled power module, the additional preassembled power module also including guide supports coupled at a first end to the upwardly extending support and extending outwardly beyond the electrical components.

9. The tower of claim 8, further including:

an external rail coupled to a one of the guide supports of the preassembled power module and to a one of the guide supports of the additional preassembled power modules.

10. The tower of claim 1, wherein in combination with a rotor for use in a wind turbine.

11. The tower of claim 1, wherein the preassembled power module includes at least one of: an electrical converter, a transformer and a controller.

12. A preassembled power module for use in a tower, the module including:

an upwardly extending support;

electrical components that extend outwardly beyond the upwardly extending support;

guide supports coupled at a first end to the upwardly extending support and extending outwardly beyond the electrical components; and an external rail coupled to a second end of at least one of the guide supports and extending upwardly along at least a portion of the electrical components.

13. The module of claim 12, further comprising:

a wheel coupled to a second end of another of the at least one of the guide supports.

14. The module of claim 12, further comprising:

an additional external rail coupled to a second end of another of the guide supports and extending along at least a portion of the module.

15. The module of claim 12, further comprising:

a wheel coupled to a second end of at least one of the guide supports.

16. The module of claim 12, wherein the guide supports deflect in response to an external force.

17. The module of claim 12, wherein the guide supports are spring loaded.

18. The module of claim 12, wherein the module includes at least one of: an electrical converter, a transformer and a controller.

* * * * *

UNITED STATES PATENT AND TRADEMARK OFFICE
CERTIFICATE OF CORRECTION

| | |
|---|---|
| PATENT NO. | : 8,201,378 B2 |
| APPLICATION NO. | : 12/511177 |
| DATED | : June 19, 2012 |
| INVENTOR(S) | : Karl-Heinz Meiners |

It is certified that error appears in the above-identified patent and that said Letters Patent is hereby corrected as shown below:

Column 5, line 28, "rotable" should be changed to --rotatable--.

Signed and Sealed this
Eighteenth Day of September, 2012

David J. Kappos
*Director of the United States Patent and Trademark Office*